May 27, 1924.  E. FRÖLICH  1,495,320
BRAKE FOR RAILROAD VEHICLES
Filed Aug. 26, 1921  2 Sheets-Sheet 1
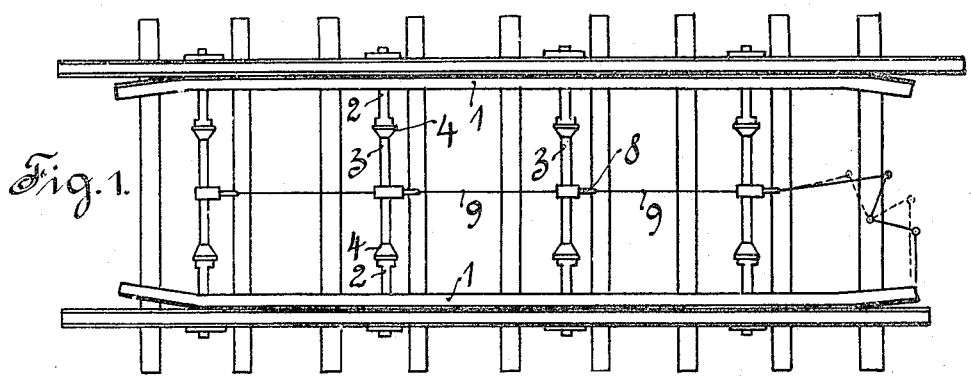
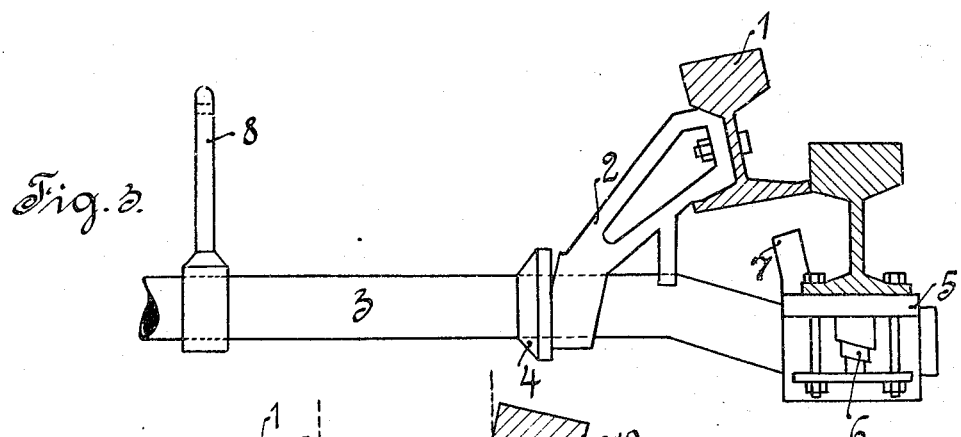
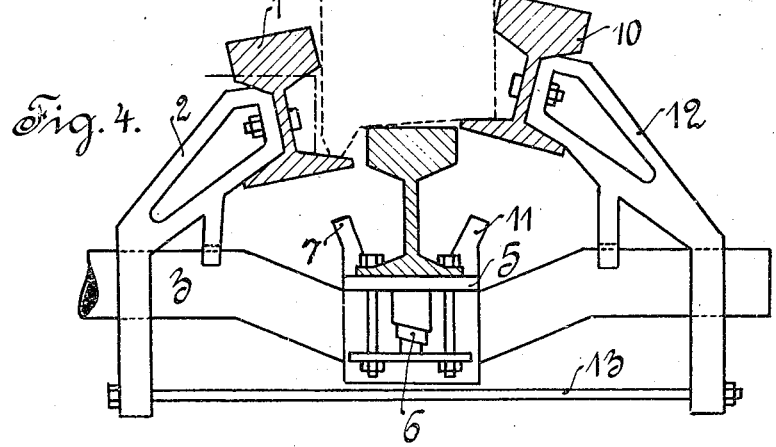

May 27, 1924.

E. FRÖLICH

BRAKE FOR RAILROAD VEHICLES

Filed Aug. 26, 1921

Inventor:
Ernst Frölich
by Oleinhauer
Attorney

Patented May 27, 1924.

1,495,320

UNITED STATES PATENT OFFICE.

ERNST FRÖLICH, OF MAINZ, GERMANY.

BRAKE FOR RAILROAD VEHICLES.

Application filed August 26, 1921. Serial No. 495,535.

*To all whom it may concern:*

Be it known that I, ERNST FRÖLICH, a citizen of Germany, residing at Mainz, Germany, have invented certain new and useful Improvements in Brakes for Railroad Vehicles (for which I have filed applications in Germany, December 11, 1913, and May 22, 1914; Belgium, February 26, 1917; France, August 30, 1919; Italy, February 6, 1920; Holland, March 26, 1921; Switzerland, March 31, 1921; Spain, March 30, 1921; Luxembourg, March 25, 1921), of which the following is a specification.

My invention relates to brakes and more especially to braking devices for railroad vehicles in which at the side of the track rails are provided. In the old devices the brake rails adapted to be raised and lowered were provided with a groove into which the wheel flanges run and which under the pressure exerted by the flange perform an angular motion causing the side wall of the groove to be pressed laterally against the wheel flange rubbing against it.

The braking device according to my invention also comprises brake rails adapted to be raised and lowered and which are pressed laterally against the wheel flanges by pressure of the wheels. However, these brake rails are provided with a head and base and are attached to tilting levers. The wheel flange running on the base portion of the brake rail causes its head to be pressed against the wheel at a comparatively high point above the head of the track rail. As compared with the weak and unsufficient braking action hitherto obtained the novel braking device exerts a very strong braking effect, which is the greater the higher above the head of the track rail the pressure is applied.

In a preferred form of my device brake rails are provided on both sides of the track rail and so connected with one another that the wheel running onto a pair of brake rails is gripped between them, the pressure being thereby prevented from being transmitted to the hub of the wheel.

To compensate any irregularities, the device for raising the brake rail is preferably supported upon springs attached to the track rail.

The construction may be so modified that the wheel only runs onto one of a pair of brake rails and the pressure of the wheel upon this rail is then transmitted to the second rail. The wheel is then sure to be always gripped uniformly between both brake rails. With this end in view, one brake rail is suitably rigidly fixed upon an arm which is connected with the bearing of the tilting lever of the other brake rail and supported like a slide together with it in a frame adapted to be raised and lowered by suitable means. The wheel itself then adjusts the slide with the two brake rails in such a manner that the rails uniformly grip the wheel between them.

In the drawings affixed to this specification and forming part thereto several modifications of a device embodying my invention are illustrated by way of example. In the drawings—

Fig. 1 is a plan showing brake device as a whole,

Fig. 3 is a like view showing a brake rail ready for action, Fig. 4 is a cross-section of a device comprising two brake rails.

Figure 6:
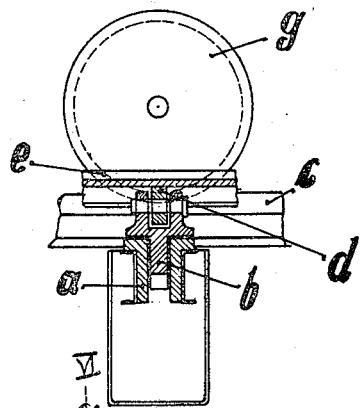
Fig. 6 is a vertical section on the line VI—VI of Fig. 5.

Referring to Fig. 1, a brake rail 1 is disposed at the inside of each track rail A. The brake rails are supported upon cranked shafts 3. The manner of supporting the rails upon the shafts 3 is illustrated more particularly in Fig. 2. The lower ends of the tilting levers 2 to which the brake rails 1 are attached embrace with play end the cranked shafts 3, collars 4 preventing the levers 2 from sliding along the shafts. The shafts 3 are supported with their cranked ends in bearings 5, which are attached by aid of springs 6 (Fig. 3) to the underside of the track rails. The bearings carry projections 7 which serve as rests for the brake rails in their inoperative position. At the middle of each shaft 3 a lever 8 is fixed which serves for rotating the shaft and for raising the tilting levers and the brake rails attached to them. The levers 8 of the various shafts 3 are linked up with one another and with the operating mechanism by a system of links 9.

In the construction illustrated in Fig. 4 a brake rail 10 is disposed at the outside and a rail 1 at the inside of the track rail, the outer rail 10 resting in its inoperative position upon the support 11, its rocking levers 12 embracing the cranked shaft 3. The lower ends of the levers 2 and 12 beyond the shaft are joined by a connecting rod 13, which takes up the forces acting in the horizontal plane, so that the collars 4 can be disposed with.

Figure 2:
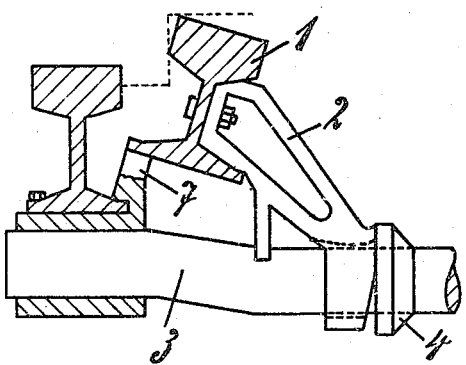
Fig. 2 is a cross-section of a track rail and a brake rail in its position of rest, drawn to a larger scale.

The brake device illustrated in Figs. 1 to 3 operates in the following manner:

In the inoperative position the middle portions of the cranked shafts are lowered (Fig. 2), the brake rails rest upon the supports 7 and in this position leave the passage unobstructed so that the wheels do not touch the rails. By operating the rods 9 the levers 8 cause the shafts 3 to be turned. Owing to the shafts being cranked the middle portion of the shafts 3 and the levers 2 with the brake rails attached to them are raised until the parts assume the position shown in Fig. 3. On the wheels entering between the brake rails, whose ends are bent away from the track rails, the heads of the brake rails are pressed against the inner faces of the wheels, while the wheel flanges run on the base portions of the rails. The brake rails are thus tilted and their heads are firmly pressed against the wheels. The braking pressure thus set up depends upon the position of the shafts 3. When the middle portion of the shaft is in its highest possible position, the full weight of the truck will act upon the brake and the braking action will be strongest. Shocks caused by unevenness or not uniform resiliency of the flanges are taken up by the springs 6.

In the brake device illustrated in Fig. 4, both brake rails 1 and 10 are uniformly pressed against the wheels owing to the connection between the lower ends of the tilting levers which causes the wheels to exert equal pressure upon both rails, the horizontal forces being taken up by the connecting rods 13 and not transmitted to the shafts 3.

Figure 5:
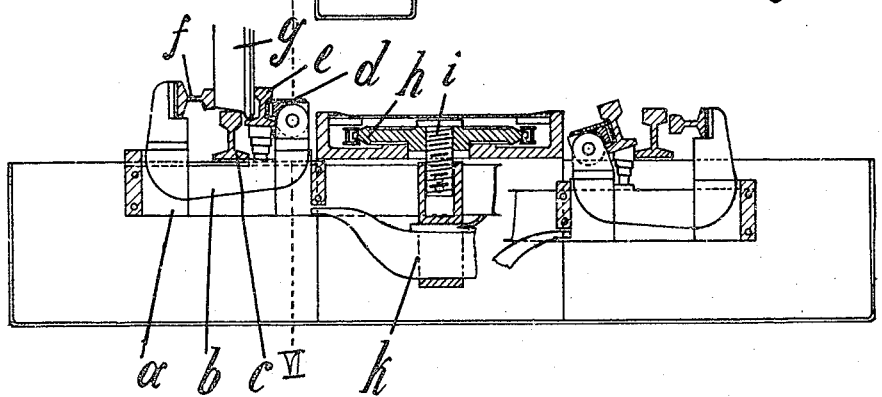
Fig. 5 is a like view of a modification.

In the device disclosed in Fig. 5 the brake rail $e$ is fixed to a rock lever $d$ which is free to rock up and down, the wheel running onto the base portion of the rail and forcing it down whereby the rail head is pressed against the side of the wheel. The pivot of lever $d$ is supported by a strap $b$ extending underneath the track rail $e$ in an opening provided in the frame $a$ and carrying at its outer end the second brake rail $f$, which is so disposed along the side of the track rail, that the wheel cannot run onto it. The strap $b$ is free to slide along the frame $a$.

In order to operate the brake device the frame $a$ can be raised by means of the chain wheel $h$ and the screw threaded bolt. A flat spring $k$ disposed intermediate the operating mechanism and the frame $a$ takes up the shocks during the braking.

This device operates in the following manner: On the frame $a$ being raised, the flange of the wheel which has reached the braking section of the track rides onto the base portion of the rail $e$ and tilts the rail against the action of a spring $s$, so that its head is pressed against the side of the wheel. By the lateral reaction exerted by the wheel upon the brake rail $e$ this latter together with the slide $b$ is moved sideways within the frame $a$, causing the second brake rail $f$ to be also pressed with its head against the side of the wheel. In this manner the wheel always adjusts the slide so that the two rails $e$ and $f$ exert a uniform braking action upon the wheel.

I wish it to be understood that I do not desire to be limited to the exact details of construction shown and described for obvious modifications will occur to a person skilled in the art.

I claim:

1. In a device of the kind described in combination, a track rail, a brake rail on each side of said track rail and a tilting lever carrying one of said brake rails, the base portion of said brake rail being disposed within reach of a wheel riding on said track rail in such manner that on its being depressed by the wheel the head portion of said brake rail is forced against said wheel.

2. In a device of the kind described in combination, a track rail, a brake rail on each side of said track rail, and tilting levers carrying said brake rails, the base portions of said brake rails being disposed within reach of a wheel riding on said track rail in such manner that on its being depressed by the wheel the head portion of said brake rail is forced against said wheel.

3. In a device of the kind described in combination, a track rail, a supporting frame extending underneath said track rail, a strap-shaped bearing adapted to slide laterally in said frame, a brake rail fixed to one end of said bearing, a rock lever at the other end of said bearing, and a second brake rail supported by said rock lever, said second brake rail being disposed within reach of a wheel riding on said track rail in such manner that on its being depressed by the wheel the head portion of said brake rail is forced against said wheel.

4. In a device of the kind described in combination, a track rail, a supporting frame extending underneath said track rail, a strap-shaped bearing adapted to slide laterally in said frame, a brake rail fixed to one end of said bearing, a rock lever at the other end of said bearing, a second brake rail supported by said rock lever and means for lifting and lowering, respectively, said frame.

5. In a device of the kind described in combination, a track rail, a supporting frame extending underneath said track rail, a strap shaped bearing adapted to slide laterally in said frame, a brake rail fixed to one end of said bearing, a rock lever at the other end of said bearing, a second brake rail supported by said rock lever, means for lifting and lowering, respectively, said frame and resilient means inserted between said means and said frame.

In testimony whereof I affix my signature.

ERNST FRÖLICH.